(12) United States Patent
Kobayashi

(10) Patent No.: US 9,129,406 B2
(45) Date of Patent: Sep. 8, 2015

(54) IMAGE PROCESSING METHOD

(71) Applicant: Masahiro Kobayashi, Kobe-shi, Hyogo (JP)

(72) Inventor: Masahiro Kobayashi, Kobe-shi, Hyogo (JP)

(73) Assignee: MASAHIRO KOBAYASHI, Hyogo (JP)

( * ) Notice: Subject to any disclaimer, the term of this patent is extended or adjusted under 35 U.S.C. 154(b) by 0 days.

(21) Appl. No.: 13/898,994

(22) Filed: May 21, 2013

(65) Prior Publication Data

US 2014/0064616 A1 Mar. 6, 2014

(30) Foreign Application Priority Data

Sep. 3, 2012 (JP) .................................. 2012-192786

(51) Int. Cl.
*G06K 9/00* (2006.01)
*G06T 5/40* (2006.01)
*G06T 5/00* (2006.01)
*H04N 5/57* (2006.01)
*H04N 21/431* (2011.01)
*H04N 21/44* (2011.01)

(52) U.S. Cl.
CPC . *G06T 5/40* (2013.01); *G06T 5/007* (2013.01); *H04N 5/57* (2013.01); *H04N 21/4318* (2013.01); *H04N 21/44008* (2013.01)

(58) Field of Classification Search
None
See application file for complete search history.

(56) References Cited

U.S. PATENT DOCUMENTS

| 5,937,090 A * | 8/1999 | Kim ............................. 382/169 |
| 6,049,626 A * | 4/2000 | Kim ............................. 382/167 |
| 6,078,686 A * | 6/2000 | Kim ............................. 382/167 |
| 7,865,033 B2 * | 1/2011 | Han et al. ..................... 382/274 |
| 8,218,896 B2 * | 7/2012 | Park et al. .................... 382/275 |
| 2006/0045373 A1 * | 3/2006 | Kurumisawa et al. ........ 382/254 |
| 2010/0034272 A1 * | 2/2010 | Miyazaki et al. ......... 375/240.16 |

FOREIGN PATENT DOCUMENTS

| JP | 2004-530368 A | 9/2004 |
| JP | 2005-055744 A | 3/2005 |
| JP | 2007-234034 A | 9/2007 |
| WO | WO 02/089060 A2 | 11/2002 |

OTHER PUBLICATIONS

Kim et al, an Advanced Contrast Enhancement Using Partially Overlapped Sub-Block Histogram Equalization, IEEE Transactions on Circuits and Systems for Video Technology, vol. 11, No. 4, Apr. 2001.*

Shahbahrami et al, FPGA Implementation of Parallel Histogram Computation, 2nd HiPEAC Workshop on Reconfigurable Computing, Jan. 27, 2008.*

* cited by examiner

*Primary Examiner* — Andrae S Allison
(74) *Attorney, Agent, or Firm* — Arent Fox LLP

(57) ABSTRACT

The disclosure describes an image processing device and an image processing method for obtaining a modified image in real time using FPGA having general processing capacity or hardware circuit of the parallel computation.

4 Claims, 5 Drawing Sheets (a)

(b)

| Brightness | Total number of pixels × 256 / all numbers of pixels |
|---|---|
| 255 | 255 |
| 254 | Total number of pixels × 256 / all numbers of pixels |
| ... | |
| 4 | Total number of pixels of brightness 0~3 × 256 / all numbers of pixels |
| 3 | Total number of pixels of brightness 0~2 × 256 / all numbers of pixels |
| 2 | Total number of pixels of brightness 0~1 × 256 / all numbers of pixels |
| 1 | Total number of pixels of brightness 0 × 256 / all numbers of pixels |
| 0 | 0 |

(a)

(b)

IMAGE PROCESSING METHOD

FIELD OF THE INVENTION

This invention relates to an image processing device and an image processing method to adjust an image containing both extremely bright and extremely dark parts, such as a surveillance camera image or an indoor window image, or a low contrast image, such as an image which overall is extremely dark or extremely bright, into one which can be clearly viewed.

BACKGROUND ART

A surveillance camera may operate for 24 hours a day, therefore, extremely bright images and extremely dark images are constantly being recorded.

The general automatic gain control of the camera often cannot keep up with an extremely large change. Also, when extremely bright and dark parts are mixed within the same picture, such as an indoor window, this cannot be dealt with by a conventional automatic gain control operation.

A method that is regulated so that brightness level I of the individual position of the image generates adjusted brightness level I' is described in patent document 1 as an image processing method comprising the steps to process an input signal to generate an adjusted output signal.

Computational complexity is reduced by reusing the result of a part repeating before and after movement when domain operation is performed with the local domain moves and repetition.

In this way the speeding up of domain operation after the movement is disclosed in patent document 2 and patent document 3.

A line buffer is adopted for the local histogram acquisition, and a technique to store all of the local histograms before one line to this line buffer is proposed in non-patent document 1 as a local histogram average technique used for HDR (High Dynamic Range) compression.

It is disclosed in non-patent document 2 that brightness conversion can be performed by the histogram equalization method from brightness distribution information provided for each and every pixel while moving one pixel of local domain to a unit.

In the above described patent documents 1-3 and non-patent documents 1 and 2, overall throughput cannot be largely reduced. Thus this inventor suggested patent document 4. In this patent document 4, it is suggested that calculation of the brightness of the pixel of the particular position is based on an algorithm to assume the loop number of times of a pixel level.

PRIOR ART

Patent Document

[Patent document 1] JP-T 2004-530,368 bulletin
[Patent document 2] Japanese Patent Laid-Open No. 2005-055744 bulletin
[Patent document 3] Japanese Patent Laid-Open No. 2007-234,034 bulletin
[Patent document 4] Japanese Patent No. 4386959th bulletin

Non-Patent Document

[Non-patent document 1]
Sosuke Shimoyama,
"Examination of the dynamic range compression technique local histogram average high speed using becoming of high quality", Institute of Electronics, Information and Communication Engineers 2008 synthesis meet lecture memoirs (information/system lecture memoirs 2), A corporate judicial person, the Institute of Electronics, Information and Communication Engineers.
On Mar. 5, 2008, page 24
[non-patent document 2] Fumihiko Saito, Area division type image contrast emphasis using GA, Institute of Image Electronics Engineers of Japan.
On Oct. 25, 1999, Vol. 28 the fifth, page 669-page 676

SUMMARY OF THE INVENTION

HDR (High Dynamic Range) disclosed in Non-patent document 1 is effective for an image with light and shade difference, but is not effective where image contrast is low, such as fog. Conversely, the technique to be disclosed in non-patent document 2 is effective for an image where contrast is low, but it cannot cope with an image having a large light and shade difference.

Patent document 4 solves the problem left unresolved by patent documents 1-3 and non-patent document 1 and 2. However, the real-time processing of the image requires high-performance CPU (GPU) and high-performance FPGA to support a screen having a much bigger pixel number than high vision.

MEANS TO SOLVE THE PROBLEM

To solve the problem, the image processing device concerning the present invention includes a means to divide an image into a plurality of blocks, a means to make a tone map from each histogram of a block divided into a plural number, and a means to calculate the brightness of every pixel.

And, as a means to calculate the brightness, for calculation a block is assumed mainly on a pixel.

Among the blocks which make up the tone map, the block produced by the assumption block and overlap is set to be a calculation object block.

Depending on the ratio of the repetition of each calculation object block, brightness is calculated for each of every calculation block.

The brightness of the pixel to become a target is calculated by adding the brightness of each calculated calculation object block.

Also, the image processing method concerning the present invention converts the brightness of the image by a two stage image scanning.

The image taken in the first scan stage is divided into a plurality of blocks, and equalization of the histogram is performed for each of every one of that plurality of divided blocks.

The tone map is made with the above, and the block is assumed mainly on a pixel for the calculation of the brightness.

Then, in the second scan stage, the block which an overlap produces to the assumption block is considered to be a calculation object block in the block that the tone map made.

In each calculation object block, brightness is calculated for each of every calculation block depending on a repetition ratio.

The brightness of the pixel to become a target is provided by adding the brightness of each calculated calculation object block.

The handling of the second stage can be processed from the calculation result for three vertical blocks of the first stage. Therefore the step of the $2^{nd}$ scan pass can process even the delay for two vertical blocks from the step of the $1^{st}$ scan pass. Thus, the calculation between the step of the 1st pass and the step of the 2nd pass can be calculated with delay with two vertical blocks by concurrent processing.

EFFECT OF THE INVENTION

According to the present invention, image processing (brightness adjustment) is possible in a short time without referring to neighboring pixels.
Thus, a still image and a video image in which an extremely gloomy part and a bright part join can be processed without using a high-performance CPU and a high-performance FPGA which can do High-speed processing.

BEST MODE FOR CARRYING OUT INVENTION

Figure 1:
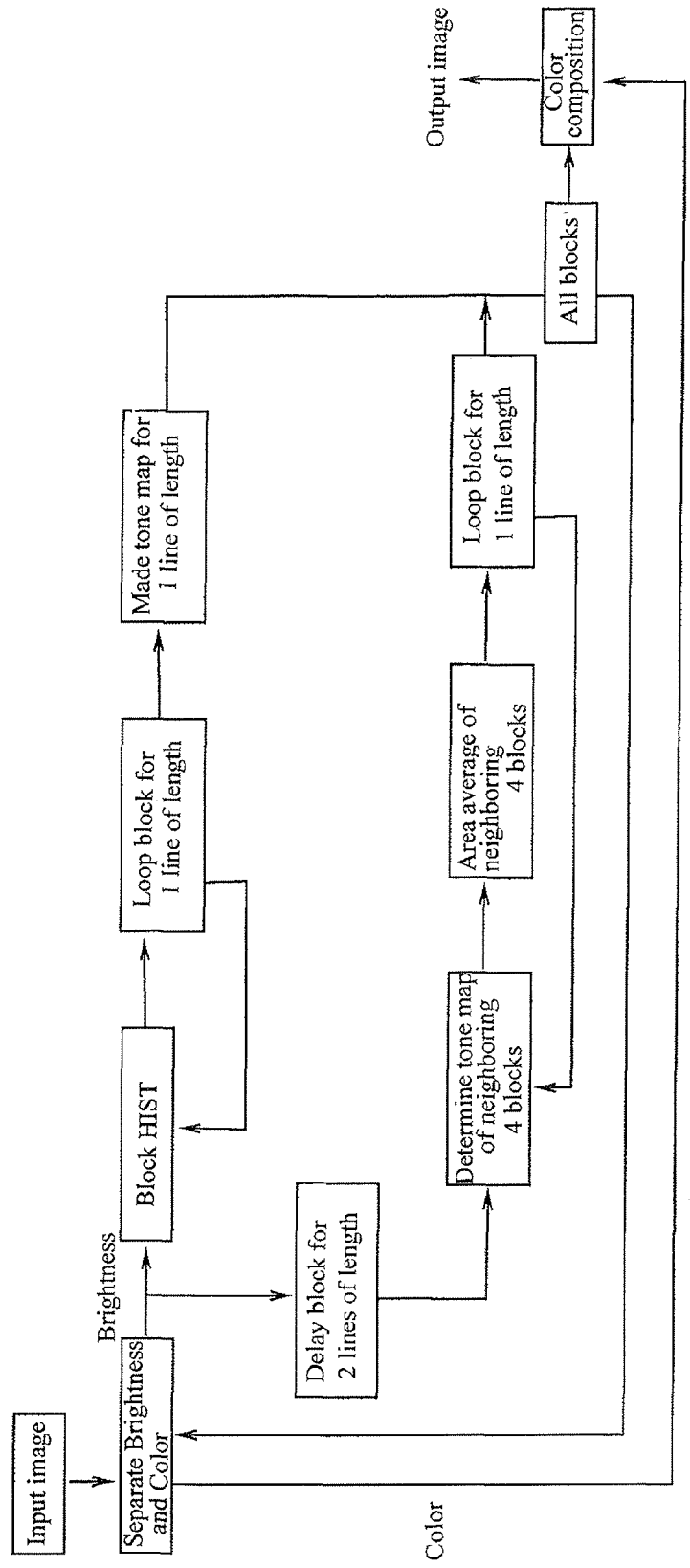
FIG. 1
Figure which described an image processing method of the present invention
FIG. 2
General view and some enlarged views of a screen divided into individual blocks
FIG. 3
(a) shows a histogram before the equalization processing,
(b) shows a histogram after the equalization processing
FIG. 4
Figure showing an example of the tone map.

An embodiment of the present invention is described below.
Firstly, as shown in FIG. 1, the present invention takes the image data of the pixel (a pixel) unit from a picture (every frame of the animation or still image) that photographed a subject.
After having broken the taken image data into the particular color space, the image is divided into a plurality of blocks. A histogram of the brightness of each and every block is generated, and the tone map for each and every block is generated based on the histogram.
The adjustment brightness of every pixel is calculated based on this tone map. According to the present invention, a plurality of color space can be expressed, and RGB, YCbCr, HSV, Lab, HLS are intended for.

Regarding brightness, the present invention divides a screen into a plurality of blocks $(0,0)$ . . . $(n-1, m-1)$ of a determinant (m×n). and the histogram of every block is obtained. The tone map of every block is made based on this histogram.

Figure 2:
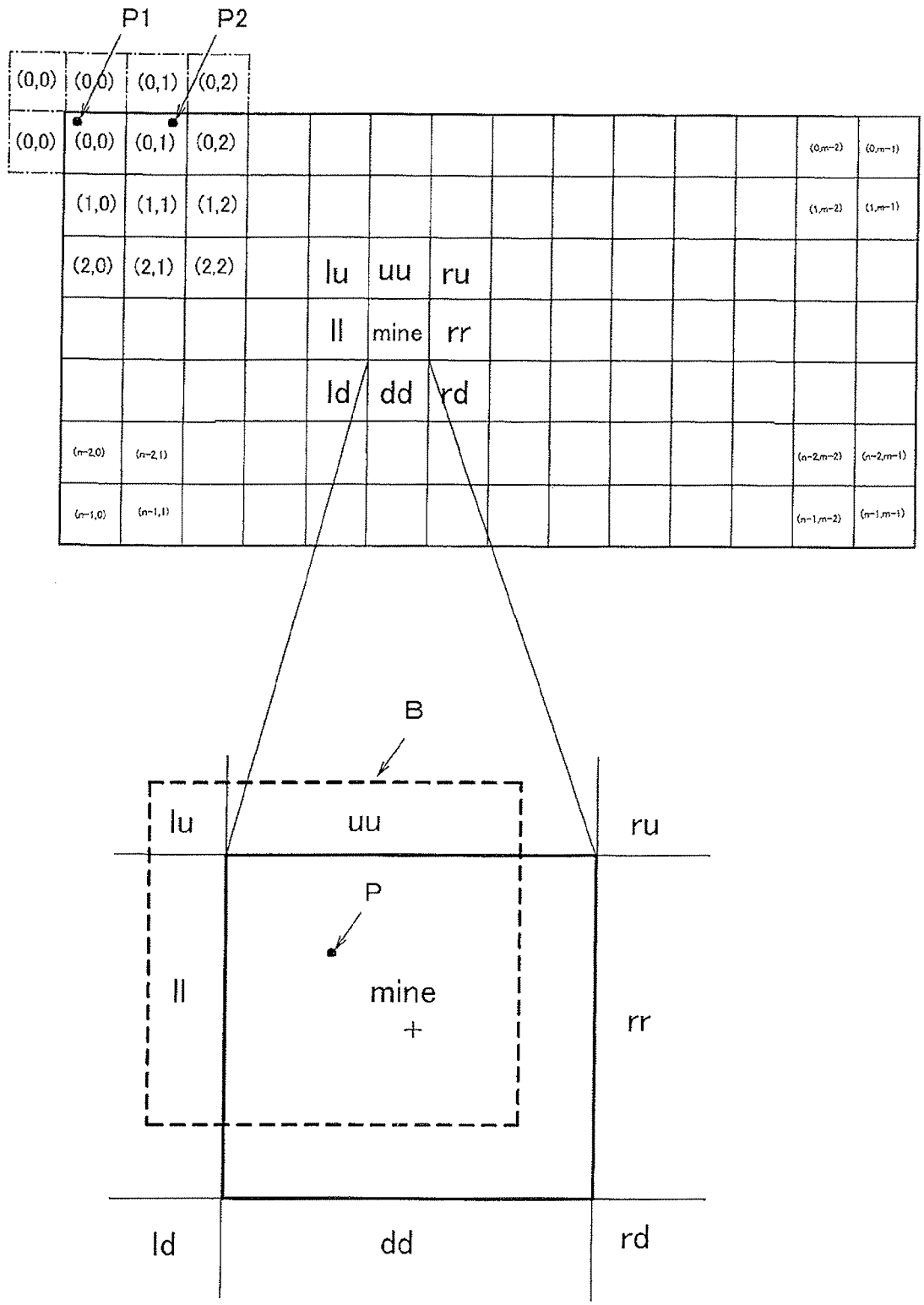

At first the histogram of every block obtains a block for one line of length. Specifically, as shown in FIG. 2, a tone map for one line of length is made by the histogram of block $(0,0)$ . . . $(0, m-1)$.

The tone map of the block $(0,0)$ . . . $(0, m-1)$ of length for two lines is made in this way. And delay (subsequently) for the making of the tone map for these two lines of length, and brightness is adjusted to every pixel becoming the adjustment object of the brightness. Then color composition is performed, and a picture is output.

Adjustment of the brightness of every pixel is described below. As shown in FIG. 2,
A plurality of blocks $(0,0)$~$(n-1, m-1)$ of a divided image includes a plurality of pixels (a pixel) respectively. And, in the present invention, a tone map is made of each of every block.

Figure 3:
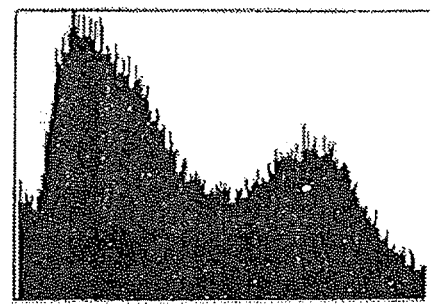
Figure 3:
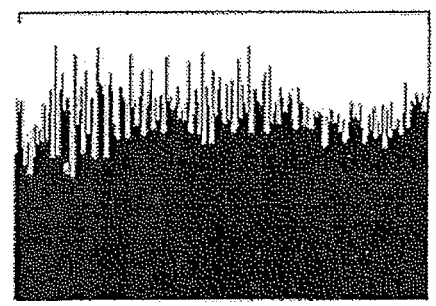

In order to make the tone map, the histogram is firstly equalized. FIG. 3 (a) is a histogram before the equalization processing, and (b) is the histogram after the equalization processing. The detail of a gloomy part becomes clear by equalizing the histogram. Also, the point where a bright part makes contact with a gloomy part spoils detail.

To cancel that the detail of the contact point of the bright and gloomy part is lost, Conventionally, an image is scanned beforehand and distribution of the brightness is detected. And equalization of the histogram is made by distributing an area. However, because it is difficult for the algorithm to generalize the division of an area, it becomes a complicated algorithm. Therefore, high-speed processing is not possible.

According to the present invention, equalization of the histogram is made for every one of a plurality of blocks, but calculation is simplified without requiring an algorithm to be performed between blocks. That is, after having equalized the histogram for each of every block, a tone map is made for each of every block.

Figure 4:
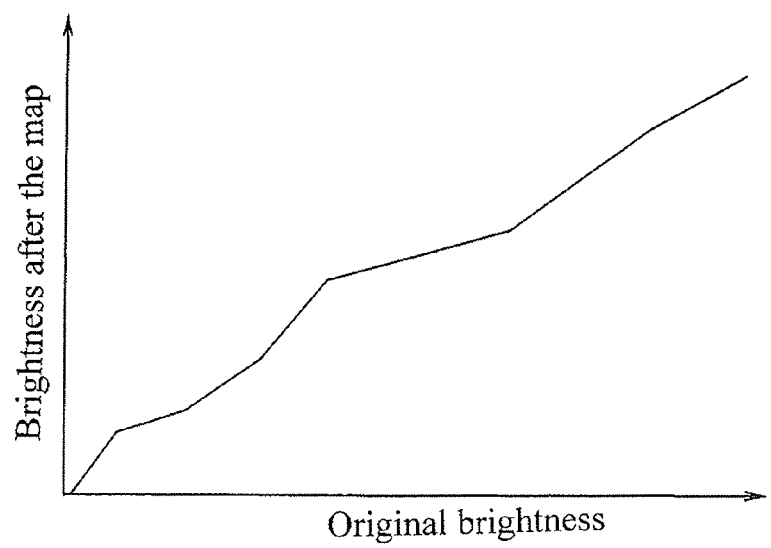

In the making of the tone map, brightness is distributed between 256 phases as shown in FIG. 4. (brightness 0 is the darkest, and brightness 255 is the brightest) A cross axis is assumed as original brightness, and a vertical axis is assumed as the brightness after the map.

Based on this made tone map, the brightness of all pixels (a pixel) is adjusted.
Specifically, as shown in some enlarged views of FIG. 2, pixel P becoming the brightness adjustment object focus. And block B around this pixel P is assumed. (pay attention to pixel P which becomes the object for brightness adjustment, and assume block B around the pixel P.)
This assumption block B assumes the same shape as block $(0,0)$ . . . $(n-1, m-1)$ into which the image was divided.

When assumption block B is put on an image, a part overlaps the block which assumption block B and an image were divided into.
In the embodiment shown, eight block (lu), (uu), (ru), (ll), (rr), (ld), (dd), (rd) exist around block (mine) where pixel P belongs to.
Block (mine) and block (lu), (uu), (ll) of these neighboring blocks are overlapped.

And for determining the brightness of pixel P, block (mine), (lu), (uu), (ll) which overlapped are assumed as calculation object block to determine brightness of pixel P.
The ratio of the area of the part that it overlapped in each calculation object block and the area of the calculation object block is calculated.
And this ratio is multiplied by the brightness (the brightness after the map) of the tone map of each calculation object block.

And adjustment brightness of pixel P is found by adding a multiplication value calculated for each of every calculation object block.

In the above, the pixel exists in block $(0,0)$ . . . $(n-1, m-1)$ by all means, and it does not exist on the boundary line of the block.
Also, when the pixel of the x×y unit exists in one block, pixel P slips off from the center point of the block unless x, y are odd numbers.
Thus, in this case overlap occurs by four blocks by all means.

As for the above, processing using parallel computation is possible. That is, an image is divided into a plurality of block (0, 0) ... (n−1, m−1). And, after the tone map making of block (0, 0) ... (0, m−1) of the first line is finished and the second line of block (1, 0), (1, 1) tone map making were finished, the brightness adjustment of the pixel included within the block (1,1) is enabled.

Thus, later from these, two handling of tone map making and brightness adjustment is performed in parallel.

Alternatively, above described calculation is not applicable for the pixel which is included in block (0, 0) ... (0, m−1) of the first line, included in block (n−1, 0) ... (n−1, m−1) of the last line, included in block (0, 0) ... (n−1, 0) of the most left bank, included in block (0, m−1) ... (n−1, m−1) of the most right bank, since eight blocks do not exist circumferentially.

As disposal of terminal pixels, in accordance with exemplary embodiments, as shown in an imaginary line of FIG. 2, the brightness adjustment of existing pixel P1 is performed in a block (0, 0) as follows: Four blocks (0, 0) are assumed by surroundings around pixel P1. Brightness of pixel P1 is adjusted based on the tone map of these blocks. In this case, in a calculation, the same tone map will be used.

Also, regarding the brightness adjustment of pixel P2 existing in a block (0, 1), four blocks (0, 1), (0, 1), (0, 2), (0, 2) are assumed by surroundings around pixel P2. And the brightness of pixel P2 is adjusted based on the tone map of these four blocks.

The above described calculation is performed for the pixel included in block (0, 0),(0, 1). Likewise, for the pixel included in the block of the penumbra of the screen, brightness adjustment is performed using the tone map of an adjacent block.

Figure 5:
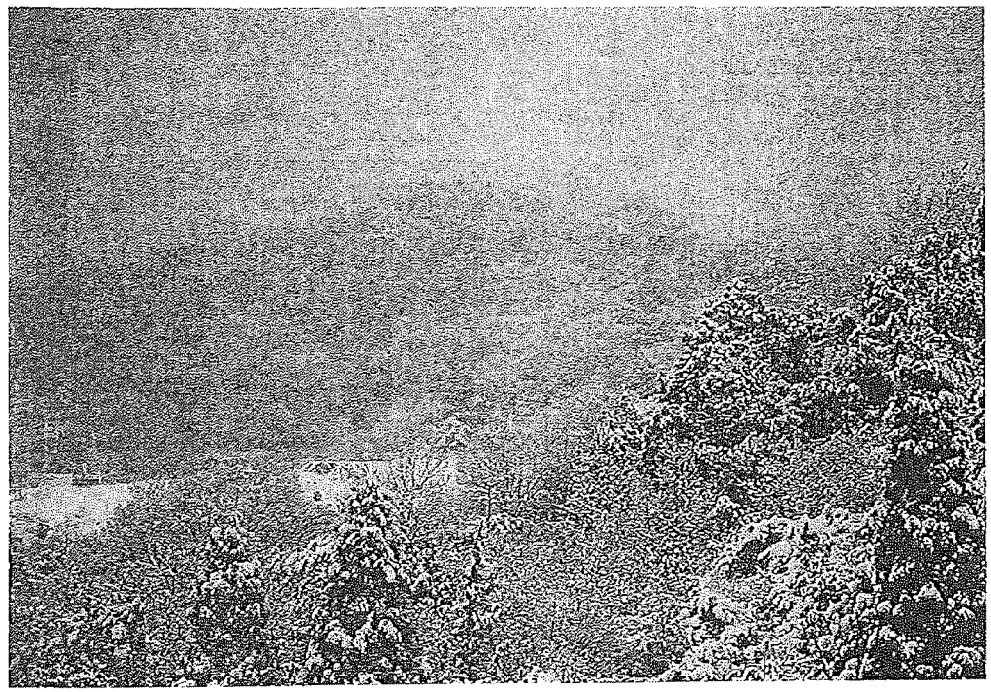
FIG. 5
(a) is an example of the image before processing
(b) is an example of the same image after processing
Figure 5:
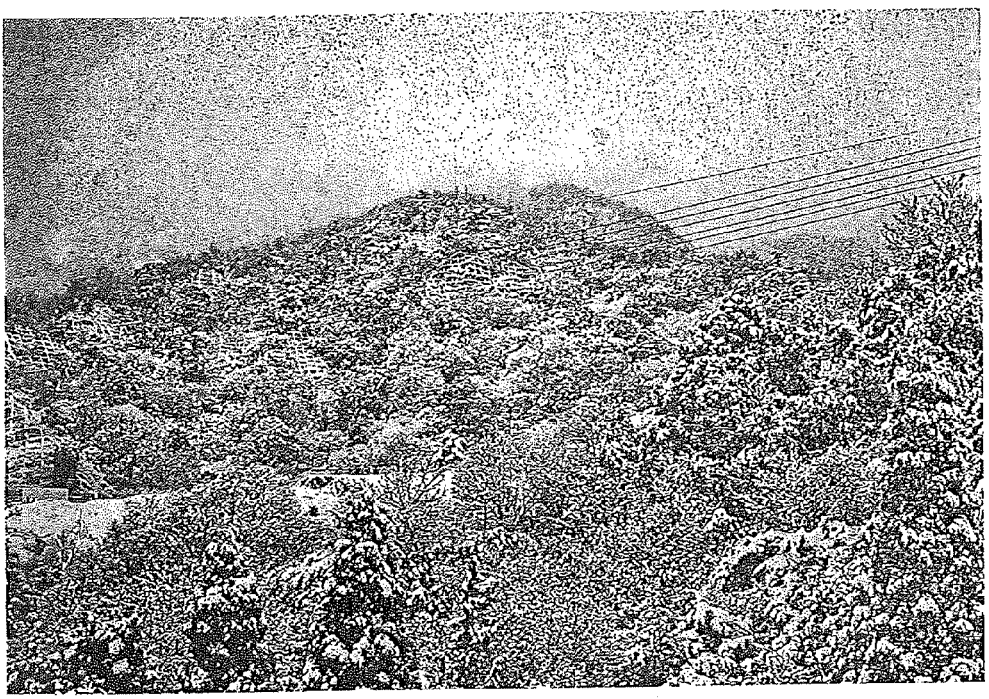

In FIG. 5 (*a*) is an example image before processing of a photograph showing thick snow falling. The image is unclear.

However, in FIG. 5 (*b*), which is image 5 (*a*) after having been processed by the present invention method, the image clarity is much improved and it can clearly be seen that a series of power lines are strung above the trees. Thus, if the picture can be grasped as a real-time image, safety is greatly improved in an extremely dangerous scenario such as a helicopter flying in fog.

INDUSTRIAL APPLICABILITY

Big screens, such as high vision televisions comprising a large number of pixels, can project pictures in which the brightness is adjusted in real time by using the image processing device concerning the present invention.

EXPLANATIONS OF THE LETTERS AND NUMERALS

P, P1, P2 ... pixel
B ... assumption block
(0,0)~(n−1, m−1) ... The block which an image was divided into
(mine) ... The block which pixel P belongs to
(lu), (uu), (ru), (ll), (rr), (ld), (dd), (rd) ... A block around (mine)

The invention claimed is:

1. An image processing method for converting the brightness of an image by image scanning, the method comprising:
   obtaining an image and dividing the image into a plurality of blocks in a first scanning;
   generating a histogram of a brightness of each of the plurality of blocks;
   equalizing the histogram of each of the plurality of blocks;
   generating a tone map for each of the plurality of blocks based on the equalized histogram;
   determining an assumption block around a pixel of the image;
   upon completing two lines of blocks in the first scanning, identifying calculation object blocks which have an overlap portion with the assumption block in a second scanning;
   determining a brightness of each calculation object block according to a repetition ratio for each calculation object block;
   adding the brightness of each calculation object block and assigning the added brightness as a brightness of the pixel; and
   repeating the first scanning and the second scanning in parallel for remaining lines of blocks of the image.

2. The method of claim 1, wherein the assumption block around the pixel of the image has a same shape as that of each of the plurality of blocks.

3. The method of claim 1, wherein the repetition ratio is a ratio between a first area of the overlap portion in each calculation object block and a second area of the calculation object block.

4. The method of claim 3, wherein determining the brightness of each calculation object block according to the repetition ratio for each calculation object block comprises multiplying the repetition ratio by the brightness of each of the plurality of blocks.

\* \* \* \* \*